United States Patent [19]

Clayton et al.

[11] Patent Number: 5,400,346
[45] Date of Patent: Mar. 21, 1995

[54] METHOD FOR DIAGNOSING CONDITIONS IN A SIGNAL LINE

[75] Inventors: James L. Clayton; Bruce G. Neale, both of Huntsville, Ala.

[73] Assignee: Phoenix Microsystems, Inc., Huntsville, Ala.

[21] Appl. No.: 851,958

[22] Filed: Mar. 16, 1992

[51] Int. Cl.⁶ .................... G06F 11/00; G06F 11/22
[52] U.S. Cl. .................... 371/29.1; 371/16.5; 371/15.1
[58] Field of Search ............ 371/29.1, 4, 5.1, 16.1, 371/16.5, 37.7, 48, 15.1, 22.1, 22.5, 22.6, 29.5, 23, 20.5; 395/325, 575, 775; 364/267.7

[56] References Cited

U.S. PATENT DOCUMENTS

| | | | |
|---|---|---|---|
| 3,634,824 | 1/1972 | Zinn | 340/147 R |
| 3,928,830 | 12/1975 | Bellamy et al. | 235/153 AK |
| 3,953,717 | 4/1976 | Rottier et al. | 235/153 AK |
| 4,495,568 | 1/1985 | Gilbert et al. | 364/200 |
| 5,119,489 | 6/1992 | Bond et al. | 395/575 |
| 5,134,617 | 7/1992 | McRoy | 371/29.1 |

Primary Examiner—Robert W. Beausoliel, Jr.
Assistant Examiner—Dieu-Minh Le
Attorney, Agent, or Firm—Phillips & Beumer

[57] ABSTRACT

A system is disclosed for intelligently providing suggestions for solving problems encountered during installation and testing of complex electronic circuitry. A plurality of first outputs provide indications of non-selectable conditions of the system, such as conditions related to power supplies. A plurality of second outputs provide indications of conditions of signals coupled to the system, and a plurality of third outputs provide indications of selectable parameters, such as switch positions. These indications and conditions are monitored for incorrect conditions and are polled in an order determined by importance of the condition with respect to operation of the system. Responsive to an incorrect condition or indication being polled, the polling process is halted and a message is generated indicating how the incorrect condition or indication may be corrected.

18 Claims, 5 Drawing Sheets

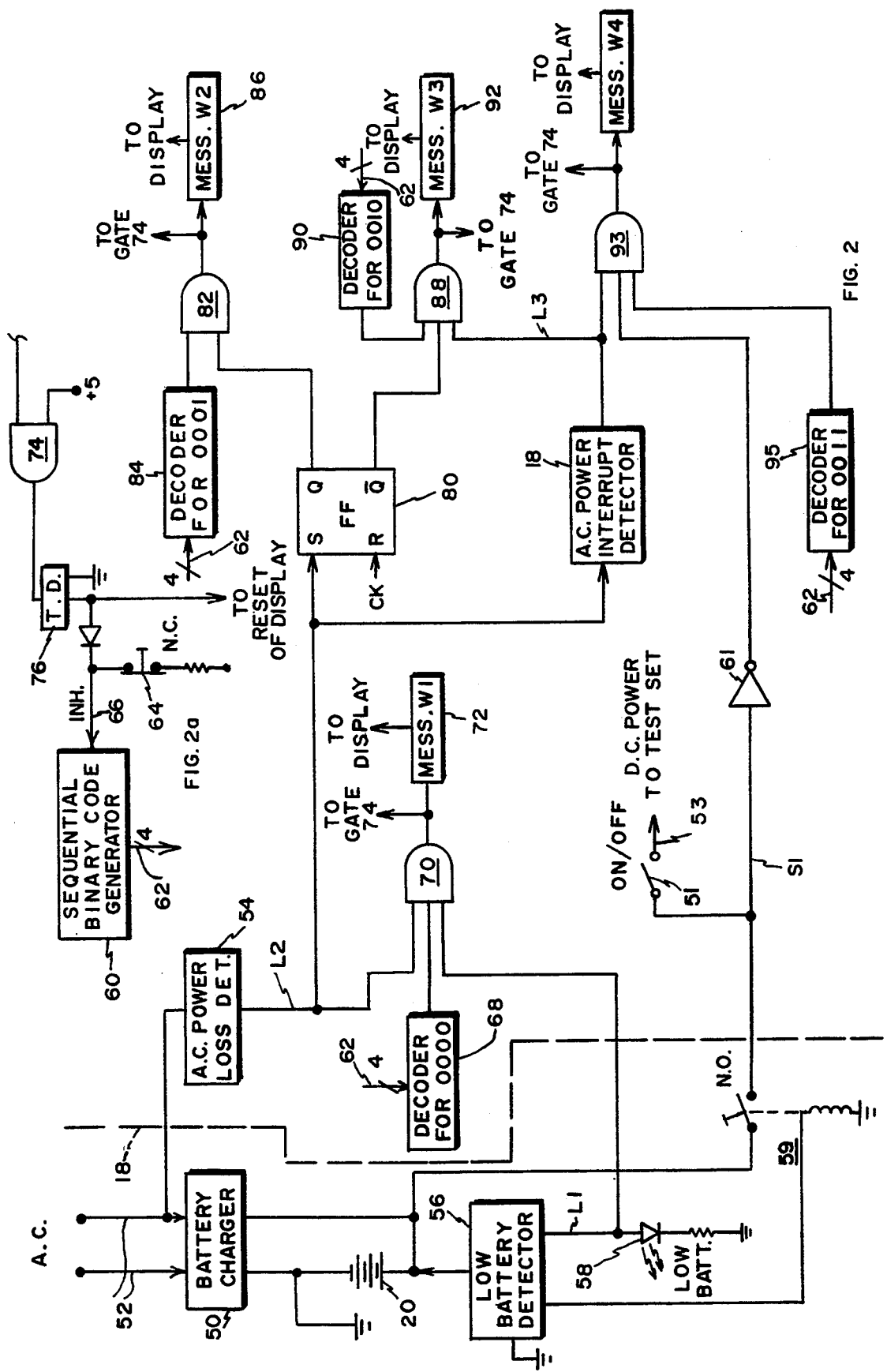

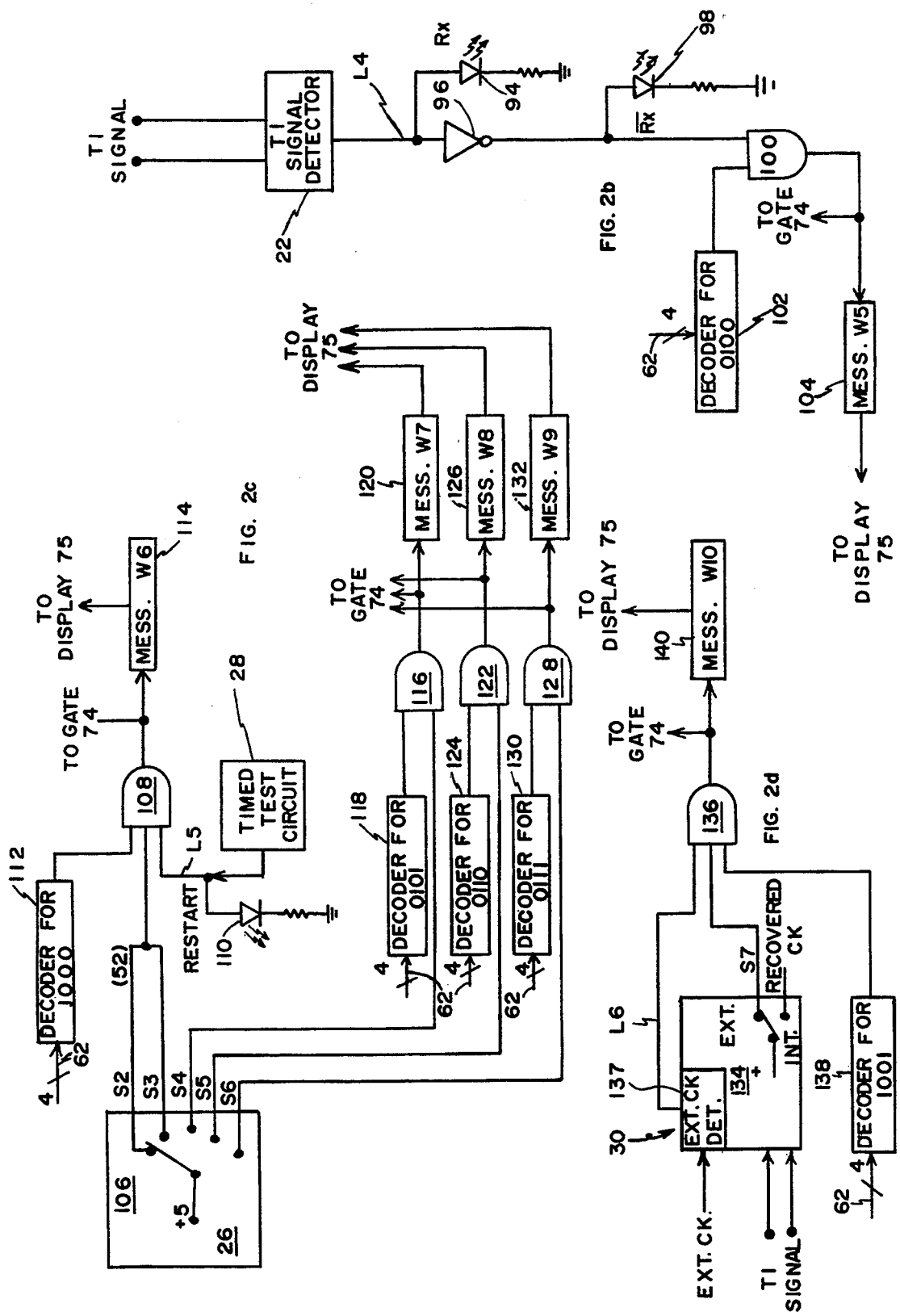

METHOD FOR DIAGNOSING CONDITIONS IN A SIGNAL LINE

FIELD OF THE INVENTION

This invention relates to methods for automatic and semiautomatic diagnosis of setup problems in complex electronic circuitry, and particularly to a method wherein circuitry couplable to a source of signals provides step-by-step diagnosis of undesired conditions while being unresponsive to desired conditions.

BACKGROUND OF THE INVENTION

In the telephone system today, which conveys voice communications and digital data, it is necessary to convey a number of channels, each carrying a discrete conversation, over a single pair of conductors or a fiber optic cable. To accomplish this, the channels are multiplexed at a particular frequency depending on the number of channels to be applied to a conductor pair. For example, in the instance where a PBX (public branch exchange) is installed in an office building, analog signals for each conversation or channel are coupled to a PBX switching and multiplexing unit in the building. Here, the signals are digitized by an A/D converter and multiplexed utilizing time division multiplexing, and output as a serial, digital data stream on a single pair of conductors at a frequency of 1.544 Mhz. At this frequency, up to 24 channels may be conveyed on the single pair of conductors, with this frequency and number of channels designated as a T1 signal. This T1 signal, or 24 digital channels at 1.544 Mhz, is routed to a switching station outside the building or to a central office proximate the destination, where the discrete 24 channels are demultiplexed and directed to their destination as an analog signal. In the instance where the call is a long distance call, connections are made to an area network, which includes a multiplexer that multiplexes the various channels at a frequency of 44.736 Mhz, and which will carry the equivalent of 24 T1 signals, or 576 discrete channels over a single pair of conductors. This frequency and number of channels is designated as a T3 signal. This particular scheme of multiplexing discrete channels at higher frequencies continues to very high data rates which are suitable for overseas communications between continents over fiber optic conductors, and which operates in the gigahertz range, and conveys in excess of 25,000 channels over a single fiber optic light guide.

In order to separate the discrete channels, and in one scheme designated as D3/D4 or Superframe, which was introduced in 1973 and which enjoys wide use today, the T1 signals are divided by framing bits into frames of 192 bits, or 8 bits per frame for each of the 24 channels, with the 193rd bit being a framing bit. The frames are further divided into sequences of Superframes, which is a sequence of 12 frames, with the Superframes being separated by framing bit sequences designated FT, which are used for synchronization, and FS, which are used for data link communication between terminals or for synchronization.

A number of problems, or errors in the data may occur in the circuitry or the pairs of wires conveying the T1 or T3 signals. Among them are (1) wander, or the difference in position where a bit happens to be and where it should be, (2) jitter, which is similar to wander, (3) drift, which is the difference between one reference clock frequency and another clock frequency, (4) slips, which are controlled repetitions or deletions of frames in order to make up for differences in digital terminal clock rates. These problems are related to properties of the signals, although other problems may occur, such as loss of signal or signal amplitude being too low or too high. Further, format or protocol problems may occur, such as incorrect or loss of framing bits, or more than 15 digital zeroes in a row. Further yet, problems may occur in transmission lines between terminals and switching stations, such as installation of cables having the wrong impedance, bad ground connections, and the like.

In order to diagnose and determine problems in a data transmission line as described, Phoenix Microsystems located in Huntsville, Ala., has developed portable test sets such as the 5575 Microbert series, which is typically a small diagnostic test set designed to be carried by a technician and which serves to perform a number of tests including bit error rate tests (BERT) and also checks signal parameters such as amplitude, frequency, etc. One version of this test set, and which is generally representative of this series, is provided with a four line by forty column liquid crystal display for displaying one of up to 24 menu selections for configuring the test set and for indicating certain types of failure modes of the signal, 14 status/alarm LED indicators, a 24 key keypad, and a number of switches used to configure the test set in order to match protocols of the signal line and/or circuitry to be tested.

Due to the complexity of the test requirements for a test set of digital communication lines, considerable familiarity with digital communications systems and protocols is required in order for a technician to operate a bit error rate tester correctly and with some measure of efficiency. It is well known that help keys and help menus are of only limited value, and that test instruments are becoming increasingly complex. Further, the technological level of users of the equipment does not generally keep pace with advances in the technology. Also, when in doubt, technicians and others operating test equipment tend to experiment with the equipment in the hopes of hitting on proper setup or test procedure, and generally only read a service or instruction manual as a last resort. This type of experimentation is inefficient, and can occasionally cause damage to the test set or to the circuitry under test.

In accordance with the foregoing, it is an object of this invention to provide a system having access to all signal inputs, to all status and selection modes of the test set and results of attempted tests, and a method inherent in the operation of the circuitry for guiding the technician to set up the test set properly so that the test set can analyze the telecommunications data and display the "Why?'s" of the problems and the solutions to such problems.

SUMMARY OF THE INVENTION

This invention consists of a communications system having first circuit means responsive to operation of a communications medium and which provides first signals indicative of operation of the medium. Second circuit means are provided having a plurality of switches couplable to the communications medium, with indicators coupled to the first and second circuit means. A first monitor means responsive to switched states of the second circuit means signals a state of a selected switch, and a second monitor means signals a condition of an indicator. A sequence sampling means samples these states and conditions of the first and second monitor means in a selected order, and provides signals which are a function of the conditions and states. These signals are then utilized to generate messages relating to incorrect operating conditions of the communications medium.

BRIEF DESCRIPTION OF THE DRAWINGS

FIG. 2 is a schematic diagram of a power supply portion of the test set and illustrating how WHY? messages may be generated responsive to incorrect conditions of the power supply.

FIG. 2a is a schematic diagram illustrating operation of a sequencing portion of the WHY? function.

FIG. 2b is a schematic diagram illustrating how an externally applied signal may be monitored.

FIG. 2c is a schematic diagram illustrating how switch positions may be monitored.

FIG. 2d is a schematic diagram illustrating how an externally applied signal and a switch position may be monitored.

DETAILED DESCRIPTION OF THE DRAWINGS

In accordance with this invention, a WHY? function and method therefor is provided which, by way of example, is incorporated in a T1 signal test set and assists a technician in the use of the test set by evaluating setup switch selections of the test set, results of completed or attempted tests, and in some instances parameters of the incoming signal and conditions of the test set itself, in a hierarchial, sequential manner and provides a message that directs the technician to the most immediate, highest order problem at hand. As an example of the hierarchy of this procedure, condition of the battery is checked initially, and if low, a message is generated indicating that the battery should be recharged. This is of the highest importance in the hierarchy inasmuch as if the condition is not corrected, i.e. charge the battery, then it would be pointless to continue as the test set is programmed to shut itself "off" when the battery drains to a selected potential. After the battery is charged, or if it presently has sufficient charge, the next highest ranking condition may be to examine whether a signal is applied to the test set. Obviously, if no signal is applied, or if the signal is of insufficient amplitude, it again would be pointless to attempt a test of the signal. Accordingly, a message is generated indicating the test set should be coupled to a signal source. This procedure is continued, with the higher ranking functions, results, and switch selections being interrogated prior to lessor functions, results and switch positions until the lowest order functions, results and switch positions are interrogated, and if all are found to be correct, a message is generated indicating that if a problem still exists, the problem cannot be attributed to setup of the test set. It is significant to note that if no setup problems exist and the WHY? function is energized, the WHY? function "falls through", or proceeds to generate the final message indicating correct setup of the test set without displaying intermediate messages. Additionally, while the WHY? function is described herein as being applied to a T1 signal test set, it will be obvious to those skilled in the art that the WHY? function may be applied to any circuitry requiring relatively complex setup, such as video cassette recorders, computers, and the like.

Figure 1:
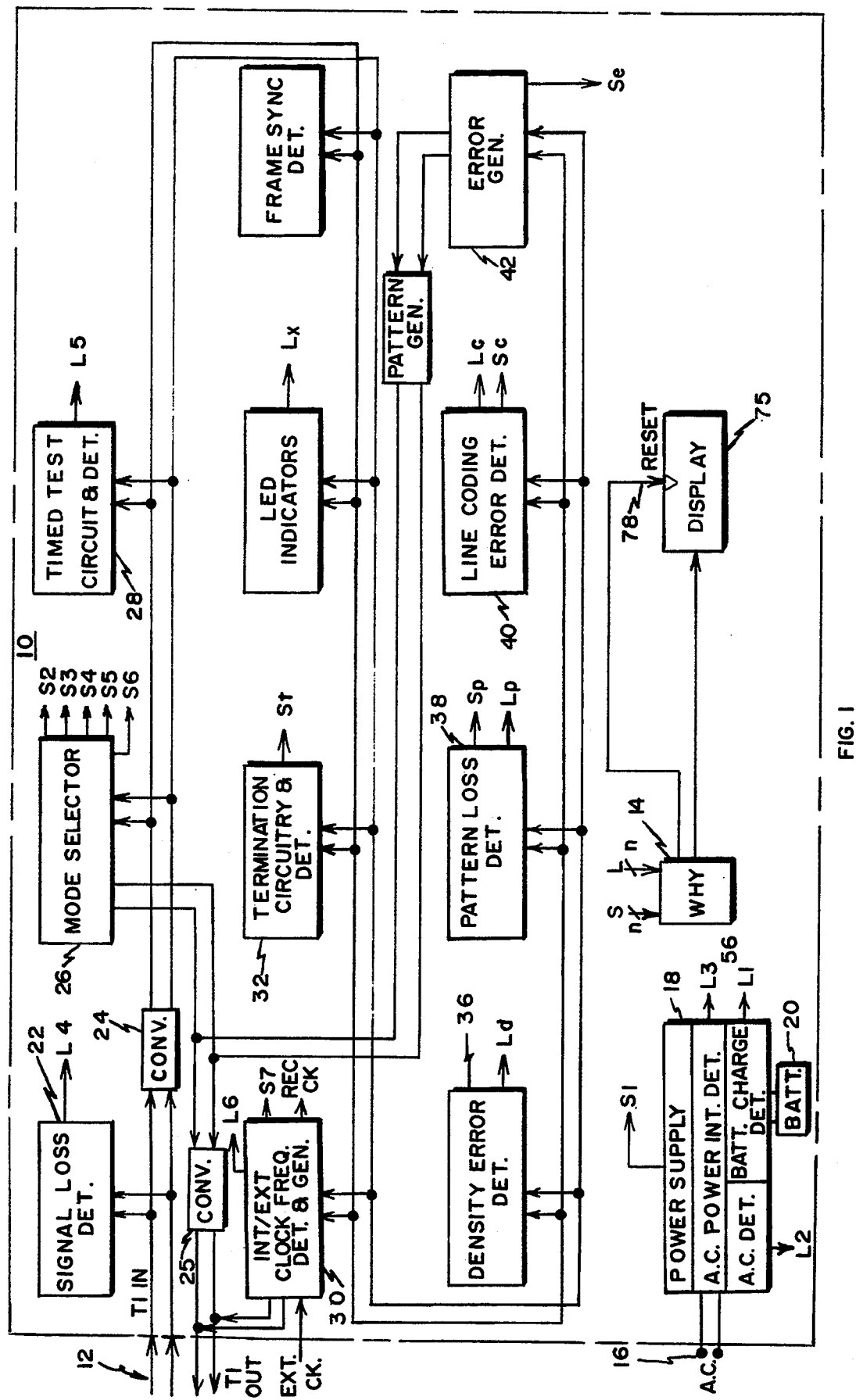
FIG. 1 is a block diagram of a signal test set incorporating the function of this invention.
Figure 3A:
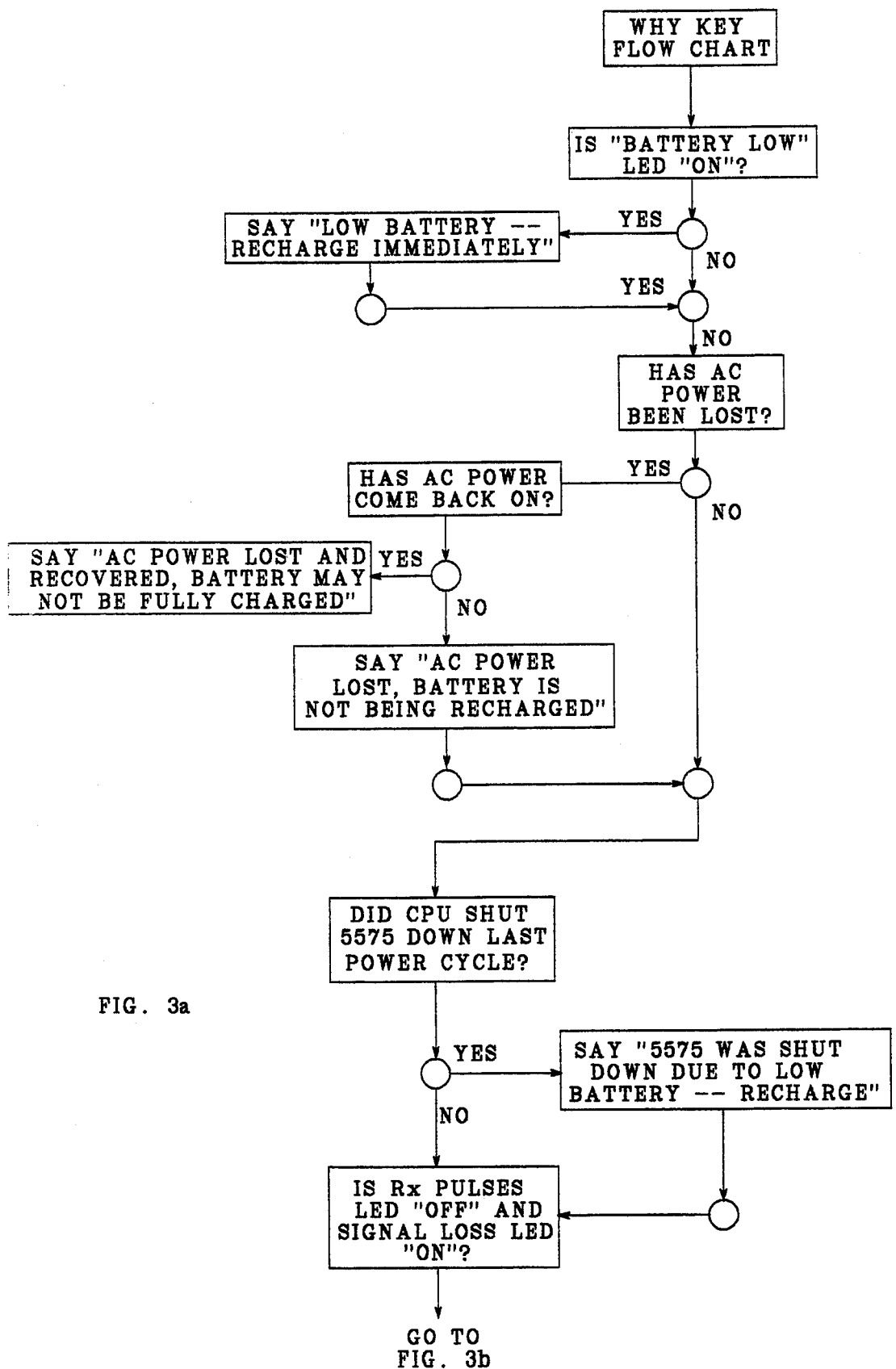
FIG. 3a and FIG. 3b are flow charts illustrating the present invention.
Figure 3B:
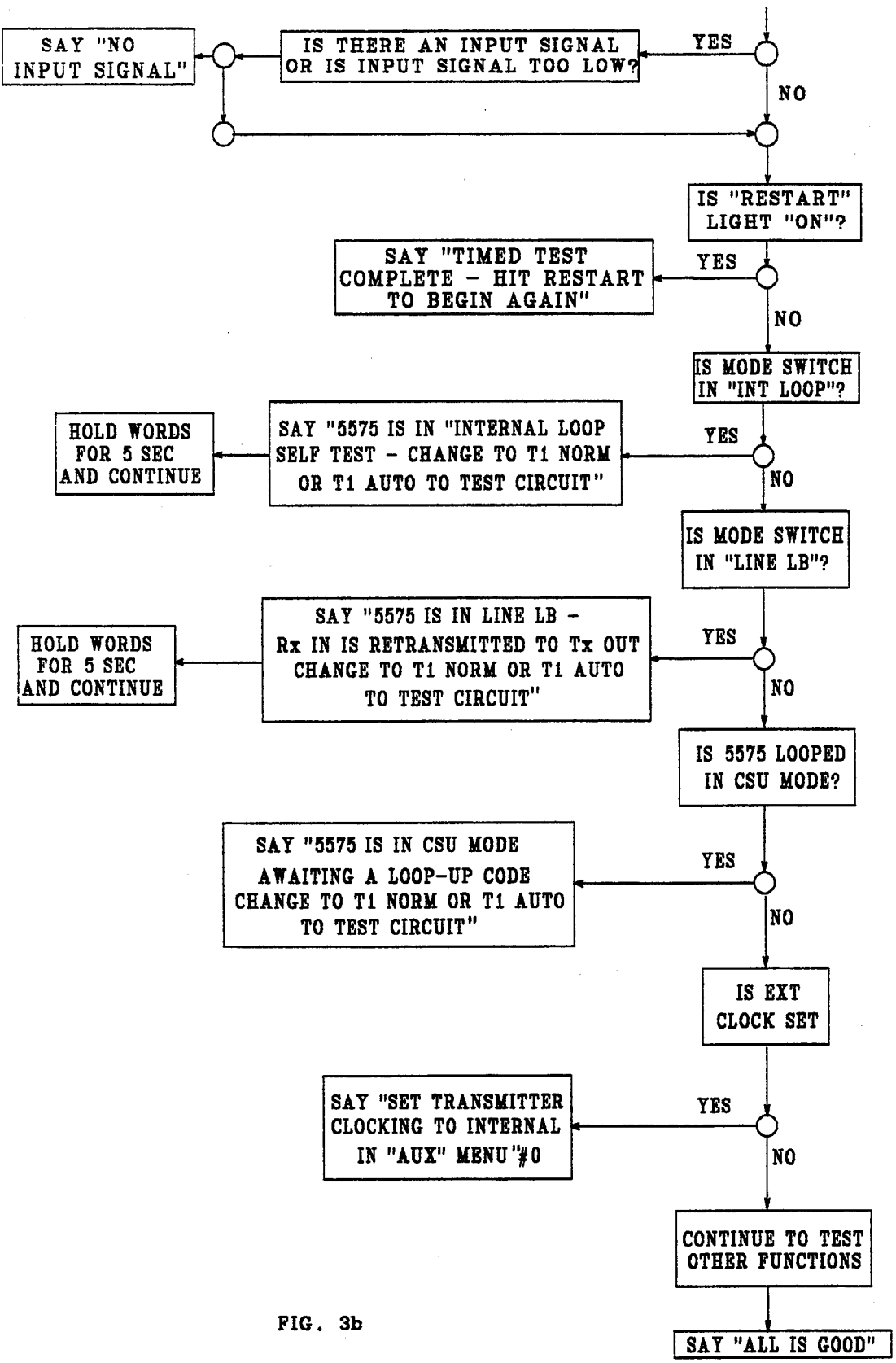

Referring initially to FIG. 1, a functional block diagram 10 sets forth functions of a portable test set as contemplated by in this invention. In general, the test set itself is used for diagnosing and isolating problems in 1.544 MHz T-carrier communication links and the T1 signals they convey. In use, the test set may be configured to automatically analyze a received T1 test pattern or signal, or the test set may be configured to perform selected tests in a manual mode. Additionally, the test set may be configured to "loop back" a received signal by applying the received signal back to the transmission line. Another application is to couple a single tester to a T1 transmission line with live traffic thereon and perform tests of framing bits, recovered clock signals, observe and store bipolar violation errors, ones density errors, and other tests.

Initially, external AC power is coupled to the test set at terminals 16 (FIG. 1), and is provided to a power supply 18 which converts the AC voltage to a DC voltage output at S1 and which is suitable for powering the digital, solid-state components of the test set. Additionally, power supply 18 monitors and maintains a charge in rechargable battery 20, which powers the test set when AC power is not readily accessible. As shown, power supply 18 provides outputs L1-L3, which are indicative of a "battery low" condition of battery 20, an interrupted condition of the AC power, and whether or not the test set has been automatically shut down due to a low power condition of battery 20, respectively. L(n) designated outputs are provided by most of the functional blocks of FIG. 1, and in general are representative of hardware and software indications of results of particular tests and conditions in the test set, or conditions of the signal that are examined in order to uniquely determine an instruction furnished the operator necessary to move the test process along a precise path. In addition to the L(n) outputs, most of the functional blocks provide at least one output designated S(n), and which is indicative of monitored switch positions or menu driven selections made during setup of the test set.

The bipolar T1 signal received from twisted pair communications line 12 is initially provided to a signal loss detector 22, which monitors the signal for insufficient signal amplitude or loss of the T1 signal. In the event the signal is lost or is of too low a level, an output L4 is provided by detector 22 indicative of such loss, and will provide an example of how an input signal condition may be monitored. After passing signal loss detector 22, the signal is applied to digital converter 24, which converts the T1 signal to a digital, or non return to zero (NRZ) signal for use by the digital circuitry of the test set. In the instance where a test signal is to be applied from the test set to a T1 span, a converter 25 performs the reverse function, i.e. converts the NRZ digital signal used inside the test set to a bipolar T1 signal.

Next in the unique sequence, mode selector 26 provides an example of how switch options for selecting a particular type of test may be monitored. Here, mode selector 26 provides options for selecting an automated test procedure (T1 AUTO), or a test procedure (T1 NORM) wherein the technician selects parameters of the test to be performed, such as selecting a particular framing protocol or a particular test pattern to be applied to the T1 line. Other functions that may be selected by mode selector 26 are an "internal loop" self test mode, which performs a self test of the test set, a "line LB" mode, which is a loopback mode that applies the received signal to the transmitter section of the test set for retransmitting the received signal back to the T1 line, and a "CSU" mode where the test set is placed in a "wait" state awaiting reception of a "loop up" or "loop down" code. Accordingly, mode selector 26 provides outputs S2–S6, respectively, indicative of a selection of one of these modes of operation.

Next in the unique sequence is a test wherein the test set may be configured to perform a timed test of data, which is achieved by timed test circuit and detector 28. In this mode, a timed bit error rate test of data of up to about 1000 hours in increments of one second may be done, with results of the test stored for later retrieval. After completing the timed test, the tester reverts to the "wait" state, and will not respond until a "restart" button is pressed. While in this "wait" state, a signal L5 indicative of the tester being in the "wait" state is provided as an output from timed test circuit and detector 28.

As another feature of the test set, and of lower ranking in the sequence, an external clock signal may be applied for synchronizing the test set with a master clock pulse of a telephone system, with internal/external selector and clock frequency detector and generator 30 performing functions of generating and providing an internal clock signal to the digital components of the test set, detecting and recovering a clock signal in the received T1 signal and checking its frequency, and providing an "internal" or "external" selection of whether the internal clock signal is used or an externally supplied clock signal is used. In the instance where the selector is set to the "external" position, the test set expects an external clock pulse, and if not applied, the test set will not function. Accordingly, an output L6 is provided by clock frequency and detector and generator 30 indicative of whether the external clock pulse is provided to the test set. Additionally, an output S7 is provided by the INT/EXT switch that selects a source of the clock signal. In this instance, application of an externally applied signal is monitored in addition to monitoring a particular setting of a switch.

While monitoring and evaluation of the foregoing switch positions, signal conditions, and conditions of the test set will be discussed in detail hereinafter, it is important to note that the above-described aspects of the Microbert test set series does not completely describe this test set, which aspects being used herein merely by way of example to illustrate operation of the WHY? function with respect to the higher order functions and conditions of this test set. Accordingly, an abbreviated description of other functions and selections of these functions which are monitored by the WHY? function will now be undertaken, these selections and functions continuing to be discussed in order of decreasing importance.

A number of alarm LED indicators are provided on the test set for indicating whether any of a number T1 signal errors have occurred during the course of a test. These LED indicators provide indications of frame synchronization or loss thereof, pattern synchronization or loss thereof, B8ZS coding (a particular type of line coding protocol), indication of detection of a significant error, density errors, unframed all ones being received, and a yellow alarm, which indicates an open line. All of these alarm LEDs provide outputs Lx, which are monitored by WHY? function 14.

When the test set is connected to the T1 span, it must be configured to present proper impedance to the transmission line. If this impedance is not correct, the line may be interrupted if live traffic is present, or signal levels may be too high or too low. Accordingly, termination circuitry and detector 32 provides St outputs which indicate impedance settings the test set presents to the T1 span. These outputs are taken from switch positions for these settings.

Another type of error that may occur are signal density errors. These are detected by density error detector 36, which outputs an Ld signal if more than 15 consecutive "zeroes" are received, or if too few "ones" are received. These errors may cause signal repeaters in the T1 span to fail to regenerate the T1 signal.

During a Bit Error Rate Test as described above, the test set or another test set typically is configured to apply a standardized test pattern to the transmission line. If the wrong pattern or a user defined pattern having density violations is selected, or if the pattern signal is lost, then pattern loss detector 38 outputs signals Lp indicative of such loss. The switch selector for this block outputs signals Sp indicating selection of a particular test pattern.

Another type of mistake that may be made during setup of the test set is inadvertent selection of a B8ZS (bipolar with 8 zero suppression) error or an AMI (alternate mark inversion) error, which errors being detected by line coding error detector 40. This detector outputs Lc signals whenever line coding errors are detected, with the selector providing outputs Sc indicating selection of either the B8ZS or the AMI mode of line coding.

Having a lowest importance in the hierarchy, error generator 42 may be enabled to inject logic errors, bipolar violations, and framing errors into the bit stream. If such a selection to inject errors is made, then these errors will be detected and registered as such. In this instance, outputs Se are provided indicating which type of error is being injected.

Next, a detailed description of one embodiment of a system which may be utilized for polling or sequentially interrogating selected aspects or conditions of the test set will be undertaken. These aspects or conditions to be discussed include those related to power supply 18, signal detector 22, timed test circuit 28 and internal/external clock frequency detector and generator 30, and will be shown to provide, in accordance with the selected hierarchy, a message or indication to a technician as to causes of a potential setup or signal problem causing the test set to not function properly. Here, and referring additionally to FIGS. 2 and 2a, power supply 18 will be examined first, it having a highest importance in the hierarchy. As stated, power supply 18 (dashed lines) includes a battery charger 50 couplable to an external A.C. power source by leads 52, and which is coupled across battery 20, which provides a positive potential on power lead 53 and through on/off switch 51 to power the test set. A.C. power loss detector 54 is coupled to one of the A.C. leads 52, and provides as an output on lead L2 a "HIGH" digital signal when A.C. power is disconnected from the test set, and a "LOW" digital signal when A.C. power is connected. Low battery detector 56 provides a "HIGH" digital signal on lead L1 to illuminate a warning LED 58, which is an indication that the battery potential has fallen to a point where D.C. power will be disconnected in about 10 minutes by detector 56 removing power from a relay coil of a normally open relay 59. Relay 59 provides an indication on lead S1 that battery power to the test set has been disconnected due to low battery power.

For interrogating aspects of power supply 18 and providing messages of (1) "low battery recharge immediately", (2) "AC power lost, battery is not being charged", (3) "AC power lost and recovered, battery may not be fully charged", and (4) "5575 was shut down due to low battery—recharge", in that order and without displaying a prior, higher order message where conditions for the higher order messages are true or have no bearing on a problem, sequential binary code generator 60 (FIG. 2a) provides on a parallel, 4 line bus 62 a sequential binary code. A 4 line bus is selected here due to the limited number of functions to be interrogated in this example, although any appropriate number of parallel bus lines may be used, depending on the number of functions to be interrogated. Code generator 60 is enabled to generate sequential binary codes when normally closed WHY? switch 64 is pressed and held open, disconnecting a +5 VDC potential from "inhibit" input 66 of generator 60. These codes from generator 60 are applied via bus 62 to a plurality of binary code decoders, each decoder providing a "HIGH" logic level responsive to a unique one of the codes. For the first message (1), a first binary code 0000 from generator 60 is applied in parallel to decoder 68, which decodes 0000 to provide a "HIGH" input to a three input AND gate 70, enabling or gating "HIGH" potentials applied to the other inputs of gate 70 and transitioning its output "HIGH". These other two "HIGH" inputs are provided by leads L1 and L2, indicating a situation wherein AC power is not applied to the test set (L2) and "battery low" LED 58 is illuminated, indicating a low battery condition (L1). Of course, if one or both of L1 and L2 is "LOW" when decoder 68 is provided a 0000 code, the output of AND gate 70 remains "LOW", and no message is provided. With the three inputs of AND gate 70 "HIGH", a "HIGH" therefrom is provided as an output to message generator 72, which provides message (1) to display 75 (FIG. 1).

For providing a discrete period of time that message (1) persists on display 75 and for inhibiting sequence generator 60 so that it will maintain code 0000 on bus 62 during such period of time and until the WHY? function is again activated to proceed to generate the next code, the "HIGH" output from AND gate 70 is also applied to one input of AND gate 74 (FIG. 2a), with the other input of gate 74 tied to a permanently "HIGH" potential. The output of gate 74 is connected to a time delay circuit 76, which provides a positive potential to "inhibit" input 66 during the time delay, maintaining a "HIGH" potential at the "inhibit" input of code generator 60 for a discrete period of time, say from 5 to 10 seconds. Upon expiration of the time delay, this potential transitions "LOW", once again making the "inhibit" input responsive to switch 64 while maintaining code 0000 prior to switch 64 again being pressed. Additionally, the "LOW" from time delay 76 is applied to active low reset input 78 of display 75, removing the message after expiration of the time delay. With these components connected as such, when the battery is not fully charged and AC power is not connected, the WHY? switch may be depressed and briefly held open, enabling message generator 72 to generate message (1), indicating that the battery should be charged, with switch 64 being released during the time the message is displayed.

Similarly, and in the instance where the battery is charged but AC power is lost, output L2 from AC power loss detector 54, which transitions "HIGH" when A.C. power is lost, is applied to the "set" input S of a flip-flop (FF) 80, with a clock pulse applied to the "reset" input of FF 80. The Q output of FF 80, transitioning "HIGH" with the loss of A.C. power, is applied to one input of two input AND gate 82, with the other input of AND gate 82 taken from the output of decoder 84, which is coupled to bus 62 and configured to decode 0001 from sequence generator 60 and provide a "HIGH" logic level responsive to such decoding. The output of AND gate 82 is coupled to message generator 86, which when enabled, provides a message of "AC power lost, battery is not being recharged" to display 75, and to AND gate 74 to enable time delay 76 for displaying this message for 5-10 seconds as described.

For displaying message (3), the NOT Q output of FF 80 is coupled to one input of a three input AND gate 88, with a second input thereto provided by power interrupt detector 18, which detects if A.C. power to the test set is interrupted while the battery is being recharged. If this is the case, detector 18 provides a "HIGH" logic level to AND gate 88. The third input to AND gate 88 is provided by decoder 90, which is coupled to bus 62 and uniquely decodes 0010 to provide a "HIGH" to AND gate 88, which when enabled by all three inputs, provides a "HIGH" to enable message generator 92, in turn providing the message to display 75 of "AC power lost and recovered, battery may not be fully charged". As described, the "HIGH" from gate 88 is also applied to gate 74 to enable time delay 76.

Message (4) is obtained by coupling the L3 output from power interrupt detector 18 to one input of a three input AND gate 93, with a second input taken from lead S1 coupled to normally open relay 59, which is opened to remove D.C. power to the test set whenever power has been interrupted due to a low battery condition. This relay may be resettable by hand, as by a conventionally configured holding circuit (not shown) to energize the relay coil and hold the relay contacts closed after being manually shut. Alternately, low battery detector 56 may be provided with a time delay circuit for closing relay 59 only after a period of time has elapsed sufficient for battery 20 to become charged. When power is disconnected by relay 59, inverter 61 inverts the resulting "LOW" potential on lead S1 to a "HIGH", which is applied to gate 93. The third input to AND gate 93 is provided by decoder 95, which decodes 0011 provided by sequence generator 60.

Message (5) is related to whether a T1 signal is coupled to the test set, or if the signal is of insufficient amplitude. Here, and referring to FIG. 2b, T1 signal detector 22 detects the T1 signal and provides an output on lead L4 indicative of whether or not a T1 signal is being received. In the instance where a signal is being received, a "HIGH" signal is provided on lead L4 to LED 94, illuminating LED 94 indicating reception of a T1 signal. In the instance where there is no signal or the signal is of insufficient amplitude, a "LOW" is provided on L4, which is converted to a "HIGH" by inverter 96, in turn outputting a "HIGH" to "signal lost" LED indicator 98 and to one input of a two input AND gate 100. The other input to AND gate 100 is provided by decoder 102, which uniquely decodes 0100 applied to bus 62 by sequence generator 60 (FIG. 2), and enables gate 100 to enable message generator 104 to provide the message "no input signal" to the display 75 and also to enable time delay 76 as described.

Message (6) relates to the position of mode selector switch 106 of mode selector 26 (FIG. 2c) in conjunction with whether a timed test has been completed by timed test circuit 28. Here, if switch 106 is in either of the T1 NORM or T1 AUTO positions, designated S2 and S3, respectively, a "HIGH" is provided by either of leads S2 or S3 to one input of three input AND gate 108. A second input to gate 108 is provided on lead L5 by circuit 28, with this input being "HIGH" and illuminating LED 110 when a timed test has been completed, which provides an indication that a "restart" switch (not shown) should be closed to enable the test set. A third input to AND gate 108 is provided by decoder 112 coupled to bus 62, and which is configured to decode 1000 and provide a logical "HIGH" to AND gate 108 responsive thereto. The output of AND gate 108, when "HIGH", enables message generator 114 to provide to display 75 the message (6) of "timed test complete—hit restart to begin again", and remove the message after the proscribed time delay.

Message (7) is derived from lead S4 of switch 106, which is the INT LOOP position that places the test set in an internal self-test mode. Lead S4 provides one input to a two input AND gate 116, with the other input taken from decoder 118, which is coupled to bus 62 and decodes a 0101 to output a "HIGH" to gate 116. Gate 116 then provides a "HIGH" to enable message generator 120 to produce the message "5575 is in internal loop self test—change to T1 NORM or T1 AUTO to test circuit" on display 75.

Message (8) is similarly obtained by coupling lead S5 from switch 106 to one input of two input AND gate 122, with the other input derived from decoder 124 coupled to bus 62, and which is configured to decode 0110 to produce a "HIGH" output to gate 122. When enabled, gate 122 in turn enables message generator 126 to provide the message "5575 is in LINE LB—Rx in is retransmitted to Tx out—change to T1 NORM or T1 AUTO to test circuit" to display 75.

Message (9) is likewise produced by coupling lead S6 from switch 106 to one input of two input AND gate 128, with the other input provided as described from decoder 130. Decoder 130 is coupled to bus 62 and decodes 0111 to provide a "HIGH" to AND gate 128. When enabled, AND gate 128 provides a "HIGH" to message generator 132, which then provides the message "5575 is in CSU mode awaiting a loop-up code—change to T1 NORM or T1 AUTO to test circuit" to display 75.

The last message (10) to be described in detail is related to position of the selector switch 134 of internal-/external clock detector and generator 30. Lead S7 indicates if switch 134 is set to the EXT position, meaning that an external clock signal is required. In this position, a "HIGH" is provided to one input of a three input AND gate 136, with another input provided by lead L6 from external clock detector 137. Lead L6 provides a "HIGH" logic level to AND gate 136 if an external clock signal is not applied to the test set, and a "LOW" if the external clock signal is applied. The third input to AND gate 136 is provided by decoder 138 coupled to bus 62, which decodes a 1001 and provides a "HIGH" to gate 136. With these inputs "HIGH", message generator 140 is enabled to provide the message "set transmitter clocking to INTERNAL in AUX menu #0". In this instance, no message is enabled at this point when the external clock is applied to the test set due to L6 being "LOW".

In operation, a technician couples the test set to a T1 communications line and configures the test set to perform selected tests of the T1 signal. In the case of an automated test, the technician switches the test set to T1 AUTO mode using MODE switch 106, which activates the test to perform a number of tests and report the results. In the T1 NORM mode, the technician selects which tests are to be performed, and activates the test set. At this point, all the L(n) and S(n) outputs from the functional blocks of FIG. 1 become available for use by WHY? circuit 14, this being indicated by a slash (n) on the S and L inputs thereof and indicating multiple inputs. Accordingly, these S(n) and L(n) outputs are simultaneously applied as inputs to the discrete gates that enable the various messages capable of being displayed, with a gating signal from a decoder being necessary in order to produce the message.

In the instance where the test set does not appear to function properly, and referring to FIGS. 2 and 2a, the technician may press WHY? switch 64 and hold the switch open to display a message as to ascertain a possible problem, with the switch being released after a message is displayed. This removes the inhibiting +5 volt potential from the "inhibit" input of sequence generator 60, allowing it to sequentially generate the binary codes as described, beginning with code 0000. This code is applied via bus 62 to all the decoders, with only decoder 68 decoding this code and applying a "HIGH" to AND gate 70. In the instance where L1 and L2 are "HIGH", indicating that A.C. power loss has occurred and battery 20 is at a low state of charge, this "HIGH" provided by decoder 68 gates the "HIGH" logic levels on L1 and L2 to message generator 72 to produce the first message W1 as described. Additionally, the "HIGH" from AND gate 70 is applied to AND gate 74, which inhibits sequence generator 60 for the period of delay 76, also as described. If one or both of outputs L1 and L2 are "LOW", then AND gate 70 is not enabled and sequence generator 60 provides the next code, 0001, to bus 62. This code is decoded by decoder 84, which applies a "HIGH" logic level to one input of AND gate 82. If the other input to AND gate 82 is "HIGH", indicating A.C. power loss, gate 82 enables message W2 to be generated and sequence generator 60 to be inhibited. If the other input to gate 82 is "LOW", generator 60 provides the next code, 0010, which is decoded by decoder 90 to apply a "HIGH" to gate 88. If the other inputs to gate 88 are "HIGH", indicating that A.C. power has been lost and regained, gate 88 produces message W3 as described. In the instance where one or both of these outputs are "LOW", gate 88 is not enabled and generator 60 provides the next code, 0011, which is decoded by decoder 95. Decoder 95 provides a "HIGH" input to AND gate 93, and if the other two inputs thereto are "HIGH", indicating that power to the test set has been disconnected due to low battery power and that an A.C. interrupt condition has been detected, then message W4 is generated. This describes how conditions related to A.C. and battery power applied to the test set may be monitored and used to generate the described messages.

Referring now to FIGS. 2a and 2b, in the instance where the communications signal is lost or is of insufficient amplitude, signal detector 22 applies a "HIGH" logic potential on lead L4 when a signal is being received, illuminating LED 94. This "HIGH" is inverted by inverter 96 to produce a "LOW", which is applied to AND gate 100, disabling gate 100. In the instance where the signal applied to the test set is lost, L4 goes "LOW", which is inverted to a "HIGH" by inverter 96, which "HIGH" being applied to gate 100 and LED 98, illuminating LED 98. At this point, if the WHY? switch 64 is pressed and held open, and assuming there are no problems with the power supply, sequential binary codes will be generated to 0100, which is decoded by decoder 102 to apply a "HIGH" to gate 100. Gate 100 is enabled, generating message W5 and inhibiting sequence generator 60. This is an example of how an externally applied signal may be monitored.

With respect to FIGS. 2a and 2c, an example of how switch positions may be monitored is illustrated. Here, the switch of mode selector 106 and having positions T1 NORM, T1 AUTO, INT. LOOP, LINE LB, and CSU for switching the test set into these modes as described above is coupled to WHY? function 14. The wiper arm of the switch is coupled to a +5 volt potential, with this potential indicative of the switch being placed in one of these modes. Thus, and assuming there is no problem with the power supply or the signal applied to the test set, and the wiper of the switch is in the T1 NORM or the T1 AUTO position, a "HIGH" logic level is applied to gate 108. If a timed test has been completed, then L5 will be "HIGH" as described, illuminating "restart" LED 110 and applying a "HIGH" logic level to gate 108. At this point, if the WHY? switch 64 is opened, codes will be generated to 1000, which is decoded by decoder 112, which applies a third "HIGH" to gate 108, enabling it to pass a "HIGH" to message generator 114, producing message W6. This is another example of how a switch and a condition may be monitored. For the other switch positions INT. LOOP, LINE LB, and CSU, which are used for functions other than bit error rate testing, the leads S4, S5, and S6 are coupled to one input of AND gates 116, 122, and 128, respectively. If any of these positions are selected and WHY? switch 64 is opened, then the respective one of decoders 118, 124, or 130 provide a "HIGH" to one of gates 116, 122, or 128, producing one of messages W7, W8, and W9 and inhibiting code generator 60 as described.

Lastly, and referring to FIGS. 2a and 2d, if the codes from sequence generator 60 are not inhibited by a problem as described when WHY? switch 64 is opened, and the INT/EXT switch of selector 134 is set to the EXT position, and no external clock signal is applied, then external clock detector 137 provides a "LOW" on lead L6 to AND gate 136. A "LOW" is also applied on lead S7 by the switch position EXT to AND gate 136, meaning that when code 1001 is applied to bus 62, decoder 138 provides a "HIGH" to AND gate 136, enabling generation of message W10. Of course, if an external clock signal is applied, L6 is "LOW", gate 136 is disabled and no message is generated.

While only a portion of the functions of the test set have been described, it is apparent that the WHY? function may be applied to all the functions thereof, and as shown, may be configured to monitor external signals, switch positions, internal signals, operational conditions of the test set or combinations of all of these. Further, it is to be noted that while the WHY? function is generally concerned with problems of configuration or operation of the test set, the construction of the WHY? function is oriented toward generating messages relating to suggestions of corrective action as opposed to merely pointing out a problem, and in the case of multiple problems, these suggestions are presented in a selected hierarchy of importance.

Having thus described our WHY? system in conjunction with a test set and the method of its operation and use, it is apparent that the WHY? system disclosed herein may be applied to other circuitry than a test set, and that incidental changes may be made to the WHY? system by those skilled in the art that fairly fall within the scope of the following appended claims, wherein.

We claim:

1. In a communications system, in combination:
    a communications medium including a plurality of first circuit means unidirectionally responsive to operation of said communications medium, for unidirectionally providing first signals reflective of said operation;
    a plurality of second circuit means including a plurality of switches selectively coupled to said communications medium, for providing second signals indicative of switched states of said plurality of switches;
    a plurality of indicator means coupled to said communications medium and said first and second circuit means, for providing selected indications representative of predetermined conditions of said communications medium and said first and second circuit means;
    a plurality of first monitor means, each responsive to at least one switched state of a respective one of said second circuit means, for signalling said state;
    a plurality of second monitor means, each responsive to a particular said condition of a respective one of said indicator means for signalling each said predetermined condition;
    sequence sampling means responsive to said signalling from said first and second monitor means, for sampling discrete said states and conditions, in sequence, and providing selected signals which are a function of said conditions and states; and
    message generation means responsive to said selected signals, for providing as an output, a message related to the conditions of said first and second circuit means and said communications medium, whereby incorrect said conditions and said states are observable.

2. A communications system as set forth in claim 1 wherein said message generation means provides a suggestion as how to correct said incorrect conditions and said state.

3. A communications system as set forth in claim 1 wherein said sequence sampling means initially samples conditions required for operation of said communications medium, and then proceeds to sample conditions of signals applied to said communications medium.

4. A communications system as set forth in claim 1 wherein said communications system is a communications line test set coupled to a communications line.

5. In an electrical device having a plurality of operational conditions, some of which being selectable, a method for assisting in resolving incorrect ones of said operational conditions and comprising the steps of:
    (1) providing a plurality of first outputs, one of each representative of a state of one of each said operational conditions;
    (2) determining a correct or incorrect state for each of said plurality of first outputs;

(3) sequentially interrogating said plurality of first outputs in a selected order;

(4) providing a selected second output responsive to a first occurring said incorrect state;

(5) halting said interrogation of said first outputs responsive to said selected second output and at a point in said selected order where said second output occurs;

(6) generating an indication responsive to said second output as how said incorrect state may be corrected, whereby as said interrogation of said first outputs is begun and proceeds in said selected order, said indication of how said incorrect state may be corrected is provided responsive to interrogation of a first one of said plurality of first outputs having said incorrect state.

6. A method as set forth in claim 5 wherein said first outputs include outputs taken from indicators indicating selected aspects of said operational conditions of said device.

7. A method as set forth in claim 5 wherein said first outputs include outputs indicating switch positions of selectors for selecting certain said operational conditions of said device.

8. A method as set forth in claim 5 wherein said first outputs include outputs indicating parameters of signals from a signal source applied to said electrical device.

9. A method as set forth in claim 5 wherein said indication of how said incorrect state may be corrected is displayed as a message on an alphanumeric display.

10. A method as set forth in claim 5 wherein said electrical device is a communications line test set.

11. A method as set forth in claim 5 wherein the interrogation of step 3 is enabled responsive to selectively operating a switch.

12. A method as set forth in claim 11 wherein after a said indication of how a said first occurring incorrect state of a discrete said first output may be corrected is provided, said switch may again be operated to continue the interrogation of step 3 according to said selected order and beginning at a point in said selected order just after where a last-occurring said second output occurred.

13. In an electrical device having a plurality of conditions configurable for having different first aspects, and a plurality of non-configurable conditions having different second aspects, a method for providing messages as how to correct incorrect ones of said first and second aspects comprising the steps of:

(1) providing first outputs comprising indications of said configurable first aspects;

(2) providing second outputs comprising indications of non-configurable said second aspects;

(3) providing third outputs comprising combinations of said first and second aspects;

(4) determining a correct or incorrect state of said first, second, and third outputs;

(5) sequentially interrogating said first, second, and third outputs in a selected order and providing a fourth, inhibiting output responsive to a first occurring said incorrect state of said first, second and third outputs;

(6) halting said interrogation responsive to said fourth output and at a point in said selected order where said fourth output occurs; and (7) generating a message of how said incorrect state may be corrected, whereby as the step of sequentially interrogating said first, second, and third outputs is activated, the steps of halting said interrogation and generating said message are unresponsive to said interrogation until said selected order of said interrogation reaches a said incorrect state of said first, second, and third outputs.

14. A method as set forth in claim 13 wherein said first outputs include signal outputs indicative of switch positions.

15. A method as set forth in claim 14 wherein said second outputs include signal outputs indicative of conditions of perceivable media.

16. A method as set forth in claim 15 wherein after said step of halting said interrogation responsive to said fourth output and at a point in said selected order where said fourth output occurs, said interrogation may be restarted at a point in said selected order where said fourth output occurs.

17. A method as set forth in claim 16 wherein said message of how said incorrect state may be corrected is provided as a message on an alphanumeric display.

18. A method as set forth in claim 17 wherein said electrical device is a communications line test set coupled to a communications line.

* * * * *